(12) United States Patent
Zhao et al.

(10) Patent No.: US 10,964,026 B2
(45) Date of Patent: Mar. 30, 2021

(54) REFINED SEGMENTATION SYSTEM, METHOD AND DEVICE OF IMAGE SHADOW AREA

(71) Applicant: INSTITUTE OF AUTOMATION, CHINESE ACADEMY OF SCIENCES, Beijing (CN)

(72) Inventors: Xin Zhao, Beijing (CN); Kaiqi Huang, Beijing (CN); Yupei Wang, Beijing (CN)

(73) Assignee: INSTITUTE OF AUTOMATION, CHINESE ACADEMY OF SCIENCES, Beijing (CN)

( * ) Notice: Subject to any disclaimer, the term of this patent is extended or adjusted under 35 U.S.C. 154(b) by 0 days.

(21) Appl. No.: 16/968,575

(22) PCT Filed: Apr. 19, 2019

(86) PCT No.: PCT/CN2019/083371
§ 371 (c)(1),
(2) Date: Aug. 8, 2020

(87) PCT Pub. No.: WO2020/177189
PCT Pub. Date: Sep. 10, 2020

(65) Prior Publication Data
US 2021/0065371 A1 Mar. 4, 2021

(30) Foreign Application Priority Data
Mar. 6, 2019 (CN) .......................... 201910168656.7

(51) Int. Cl.
*G06N 3/04* (2006.01)
*G06T 7/11* (2017.01)
*G06T 7/174* (2017.01)

(52) U.S. Cl.
CPC .............. *G06T 7/11* (2017.01); *G06N 3/0454* (2013.01); *G06T 7/174* (2017.01); *G06N 3/04* (2013.01);
(Continued)

(58) Field of Classification Search
CPC .......... G06N 3/04; G06N 3/0454; G06T 7/11; G06T 7/174; G06T 2207/20081; G06T 2207/20221
See application file for complete search history.

(56) References Cited

U.S. PATENT DOCUMENTS

2018/0330183 A1* 11/2018 Tsunoda .................... G06K 9/46
2019/0066373 A1   2/2019 Tran et al.
2020/0118423 A1*  4/2020 Moura .................. G08G 1/0116

FOREIGN PATENT DOCUMENTS

CN      106650830 A      5/2017
CN      108764247 A     11/2018
CN      108805889 A     11/2018

OTHER PUBLICATIONS

Jiang et al. ("InNet: Learning to Detect Shadows with Injection Network," Eighth International Conference on Image Processing Theory, Tools and Applications, Nov. 7-10, 2018) (Year: 2018).*
(Continued)

*Primary Examiner* — Yubin Hung
(74) *Attorney, Agent, or Firm* — Bayramoglu Law Offices LLC (57) ABSTRACT

A refined segmentation system, method and device of an image shadow area are provided. The system of the present invention includes: a feature extraction network, a reverse fusion network, and a weighted fusion network. The feature extraction network includes a plurality of sampling layers
(Continued)

which are arranged sequentially, a plurality of segmentation features of the shadow areas in the input images are obtained through the sampling layers sequentially. The reverse fusion network includes a plurality of layered reverse fusion branches, each of which includes a plurality of feature fusion layers arranged in sequence, and two input features are fused in sequence through each feature fusion layer. The weighted fusion network is configured to perform weighted fusion on outputs of the plurality of reverse fusion branches to obtain a final segmentation result of the shadow area of the input image.

20 Claims, 5 Drawing Sheets

(52) U.S. Cl.
CPC ............... *G06T 2207/20081* (2013.01); *G06T 2207/20221* (2013.01)

(56) References Cited

OTHER PUBLICATIONS

Liang et al. ("Facial feature extraction method based on shallow and deep fusion CNN," 13th International Conference on Natural Computation, Fuzzy Systems and Knowledge Discovery, Jul. 29-31, 2017) (Year: 2017).*

Mohajerani et al. ("CPNet: A Context Preserver Convolutional Neural Network for Detecting Shadows in Single RGB Images," IEEE 20th International Workshop on Multimedia Signal Processing, Aug. 29-31, 2018) (Year: 2018).*

Khan et al. ("Automatic Feature Learning for Robust Shadow Detection," IEEE Conference on Computer Vision and Pattern Recognition, Jun. 23-28, 2014) (Year: 2014).*

Kim et al. ("Convolutional Neural Network-Based Shadow Detection in Images Using Visible Light Camera Sensor," Sensors (Basel), 18(4), Mar. 23, 2018) (Year: 2018).*

Hosseinzadeh et al. ("Fast Shadow Detection from a Single Image Using a Patched Convolutional Neural Network," IEEE/RSJ International Conference on Intelligent Robots and Systems, Oct. 1-5, 2018) (Year: 2018).*

* cited by examiner

REFINED SEGMENTATION SYSTEM, METHOD AND DEVICE OF IMAGE SHADOW AREA

CROSS REFERENCE TO THE RELATED APPLICATIONS

This application is the national phase entry of International Application No. PCT/CN2019/083371, filed on Apr. 19, 2019, which is based upon and claims priority to Chinese Patent Application No. 201910168656.7, filed on Mar. 6, 2019, the entire contents of which are incorporated herein by reference.

TECHNICAL FIELD

The present invention pertains to the field of image processing, and particularly, to a refined segmentation system, method and device of an image shadow area.

BACKGROUND

A shadow often occurs in a natural scene and information of an image shadow area provides important information. The information can be used for estimating physical characteristics within the image, such as light sources, lighting conditions, scene geometries and the like. Understanding the image shadow area information may also assist in some other computer vision tasks, including image segmentation. Additionally, removing the shadow in an image has many applications in the field of computational imaging. Segmentation of the shadow area is an important and fundamental step in computational imaging. The present invention provides improvements to the segmentation of a shadow area within an image.

Given a single input image, segmentation of a shadow area is very challenging. Accurate segmentation of a two-dimensional image is also an "ill-conditioned" problem due to a lack of information. Scene geometries, surface characteristics, light source conditions and the like are obviously lesser developed in two, as opposed to three dimensions. Image priori and physical models based on information, such as illumination, color, and the like, are well developed in early methods. These model-based methods, however, have difficulty accurately locating a shadow area within an image if assumed conditions are difficult to satisfy. In order to meet this challenge, there are proposed methods based on learning and manual design features. However, due to the limitations of an expression capacity of manually designed features, prior learning-based methods also have difficulty dealing with difficult situations under natural conditions.

By using a deep neural network, an end-to-end learning process may be performed according to a large number of recorded samples. Hence, by learning a feature robustly expressed in an image, a segmentation method of a shadow area in the image may be rapidly developed using the deep neural network. However, the difficulty in obtaining a refined segmentation result of the shadow area remains for prior segmentation methods.

Since substantial capacities for discrimination, classification and spatial localization are required concurrently in refined segmentation of a shadow area, effectively fusing these functions to a successful end is critical. Generally, strong discrimination and classification features are encoded in deeper layers of the deep neural network. The deeper features have rich classification and discrimination information, but on a small scale with insufficient spatial detail information. In contrast, generally, strong spatial localization features are encoded in shallower layers of the deep neural network. The shallower features have rich spatial detail information. These shallower features, however, have a weak discrimination and classification capacity.

SUMMARY

In order to solve the problem of a low refinement degree of segmentation of an image shadow area, in a first aspect of the present invention, a refined segmentation system of an image shadow area is provided, which includes a feature extraction network, a reverse fusion network and a weighted fusion network.

The feature extraction network includes a plurality of sampling layers which are arranged sequentially, and a plurality of segmentation features of the shadow area in the input image are obtained through the plurality of sampling layers sequentially;

the reverse fusion network includes a plurality of layered reverse fusion branches, the reverse fusion branch includes a plurality of feature fusion layers arranged in sequence, and two input features are fused in sequence through the feature fusion layer;

the feature fusion layers in the reverse fusion branch are arranged corresponding to the sampling layers in the feature extraction network, and an upsampling ratio of the feature fusion layer is arranged corresponding to a downsampling ratio of the sampling layer equally;

in the reverse fusion network, an input of the feature fusion layer in a first reverse fusion branch is an output of a previous feature fusion layer and an output of a corresponding sampling layer; inputs of the feature fusion layer in other reverse fusion branches is the output of the previous feature fusion layer and the output of the corresponding feature fusion layer in an upper reverse fusion branch; and the weighted fusion network is configured to perform weighted fusion on output of the plurality of reverse fusion branches to obtain a final segmentation result of the shadow area of the input image.

In some preferred embodiments, when features in two layers are fused through the feature fusion layer in the reverse fusion branch, a deep feature is upsampled in a set ratio first, two features with different information are then fused by feature stitching, and finally, a final fused feature is obtained through a convolutional layer.

In some preferred embodiments, the number of the reverse fusion branches is three.

In some preferred embodiments, the upsampling ratio of the feature fusion layer and the downsampling ratio of the sampling layer are both 2.

In some preferred embodiments, the convolutional layer for obtaining the final fused feature has a convolution kernel of 3*3.

In some preferred embodiments, a binary-classification cross entropy loss function is used as a loss function to perform training of prediction of the shadow area. by the feature extraction network and the reverse fusion branch based on a training sample with the shadow area labeled manually.

In some preferred embodiments, the binary-classification cross entropy loss function is used as the loss function to optimize weight parameters of the weighted fusion optimized by the weighted fusion network based on the training sample with the shadow area labeled manually.

In a second aspect of the present invention, a refined segmentation method of an image shadow area based on the above-mentioned refined segmentation system of an image shadow area includes the following steps:

step S10, downsampling an input image layer by layer through the feature extraction network to obtain a plurality of segmentation features of the shadow area of the input image;

step S20, obtaining a prediction result of the shadow area output by a reverse fusion branch based on the plurality of segmentation features of the shadow area of the input image obtained in step S10; and step S30, performing weighted fusion on the prediction result of the shadow area output by the reverse fusion branch through a weighted fusion network to obtain a final segmentation result of the shadow area of the input image.

In a third aspect of the present invention, a storage device is provided with a plurality of programs stored therein. The plurality of programs is suitable for being loaded and executed by a processor to implement the above-mentioned refined segmentation method of the image shadow area.

In a fourth aspect of the present invention, a processing device is provided, including: a processor suitable for executing a program; and a storage device suitable for storing a plurality of programs which are suitable for being loaded and executed by the processor to implement the above-mentioned refined segmentation method of the image shadow area.

The present invention has the following advantages.

With the segmentation system, method and device of the shadow area according to the present invention, multi-scale features for encoding the discrimination and classification information and the spatial detail information of the input image may be fused effectively, thereby obtaining the segmentation result of the shadow area with a high degree of refinement.

BRIEF DESCRIPTION OF THE DRAWINGS

Other features, objectives and advantages of the present application will become more apparent upon reading the detailed description of non-limiting embodiments reference to the accompanying drawings, in which.

DETAILED DESCRIPTION OF THE EMBODIMENTS

For more clear understanding of the objectives, technical solutions and advantages of the present invention, a clear and complete description will be given below to the technical solutions of the embodiments of the present invention with reference to the accompanying drawings. It will be obvious that the described embodiments are only partial embodiments of the present invention but not all the embodiments. All the other embodiments obtained by those skilled in the art without creative efforts on the basis of the embodiments of the present invention shall fall within the scope of protection of the present invention.

The present application will be further described below in detail in combination with the accompanying drawings and the embodiments. It should be appreciated that the specific embodiments described herein are merely used for explaining the relevant invention, rather than limiting the invention. In addition, it should be noted that, for the ease of description, only the parts related to the relevant invention are shown in the accompanying drawings.

It should be noted that the embodiments in the present application and the features in the embodiments may be combined with each other on a non-conflict basis.

In an embodiment, the method of the invention includes a plurality of parallel reverse fusion branches stacked in sequence. Multi-scale features of a feature extraction network or the upper fusion branch are fused. The multi-scale features for encoding discrimination and classification information as well as spatial detail information are fused effectively. And weighted fusion is performed on prediction results of the plurality of reverse fusion branches to obtain a final refined segmentation result of a shadow area. Key points are mainly as follows: 1) effective fusion of a high discrimination and classification capacity and the spatial detail information is required in refined segmentation of the shadow area of an image and after the input image is given, the feature extraction network of a refined segmentation system of an image shadow area according to the present invention forward propagates to obtain different types of multi-scale feature expressions. The richer discrimination and classification information is encoded by the deep features, and the richer spatial detail information is encoded by the shallow features; 2) in the refined segmentation system of the image shadow area according to the present invention, the multi-scale features of the feature extraction network and the upper reverse fusion branch are gradually fused reversely from the deep to shallow layers by the plurality of stacked and parallel reverse fusion branches in the refined segmentation system of the image shadow area according to the present invention, thereby gradually and effectively fusing the plural types of multi-scale features of the input image in sequence; 3) the segmentation of the shadow area is predicted by the deep-supervision weighted fusion in the present invention through all the plurality of reverse fusion branches of the refined segmentation system of the image shadow area, and then, the weighted fusion is performed on the prediction results of the plurality of branches to obtain the final refined segmentation result of the shadow area.

Figure 1:
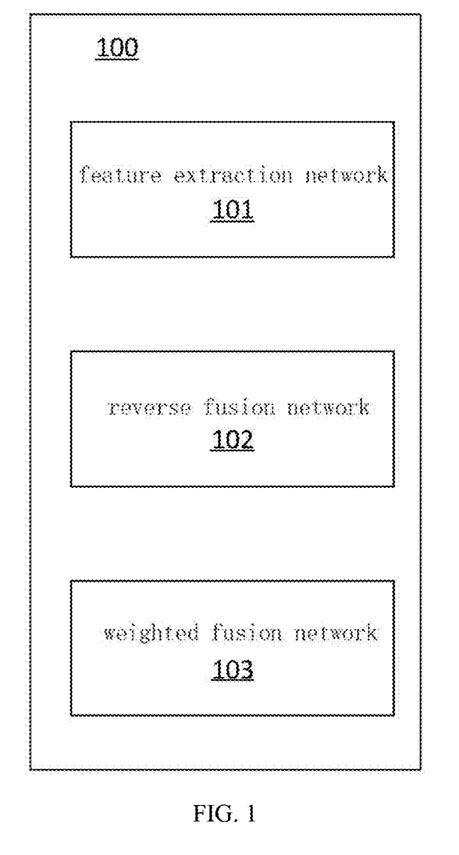
FIG. 1 is a schematic diagram of a framework of a refined segmentation system of an image shadow area according to an embodiment of the present invention.

As shown in FIG. 1, a refined segmentation system 100 of an image shadow area according to the present invention includes the feature extraction network 101, the reverse fusion network 102 and the weighted fusion network 103;

the feature extraction network 101 includes a plurality of sampling layers which are arranged sequentially, and a plurality of segmentation features of the shadow area in the input image are obtained through the sampling layers sequentially;

the reverse fusion network 102 includes a plurality of layered reverse fusion branches, each of the layered reverse fusion branches includes a plurality of feature fusion layers arranged in sequence, and two input features are fused in sequence through each of the feature fusion layers;

the feature fusion layers in the reverse fusion branch 102 are arranged corresponding to the sampling layers in the feature extraction network 101, and an upsampling ratio of the feature fusion layer is arranged corresponding to a downsampling ratio of the sampling layer equally;

in the reverse fusion network 102; an input of the feature fusion layer in the first reverse fusion branch is an output of the previous feature fusion layer and an output of the corresponding sampling layer; an input of the feature fusion layer in each of the other reverse fusion branches is the output of the previous feature fusion layer and the output of the corresponding feature fusion layer in the upper reverse fusion branch; and the weighted fusion network 103 is configured to perform weighted fusion on the outputs of the plurality of reverse fusion branches to obtain a final segmentation result of the shadow area of the input image.

For a clearer explanation of the system of the present invention, each portion of one embodiment of the system of the present invention will be described in detail below with reference to the accompanying drawings.

Figure 2:
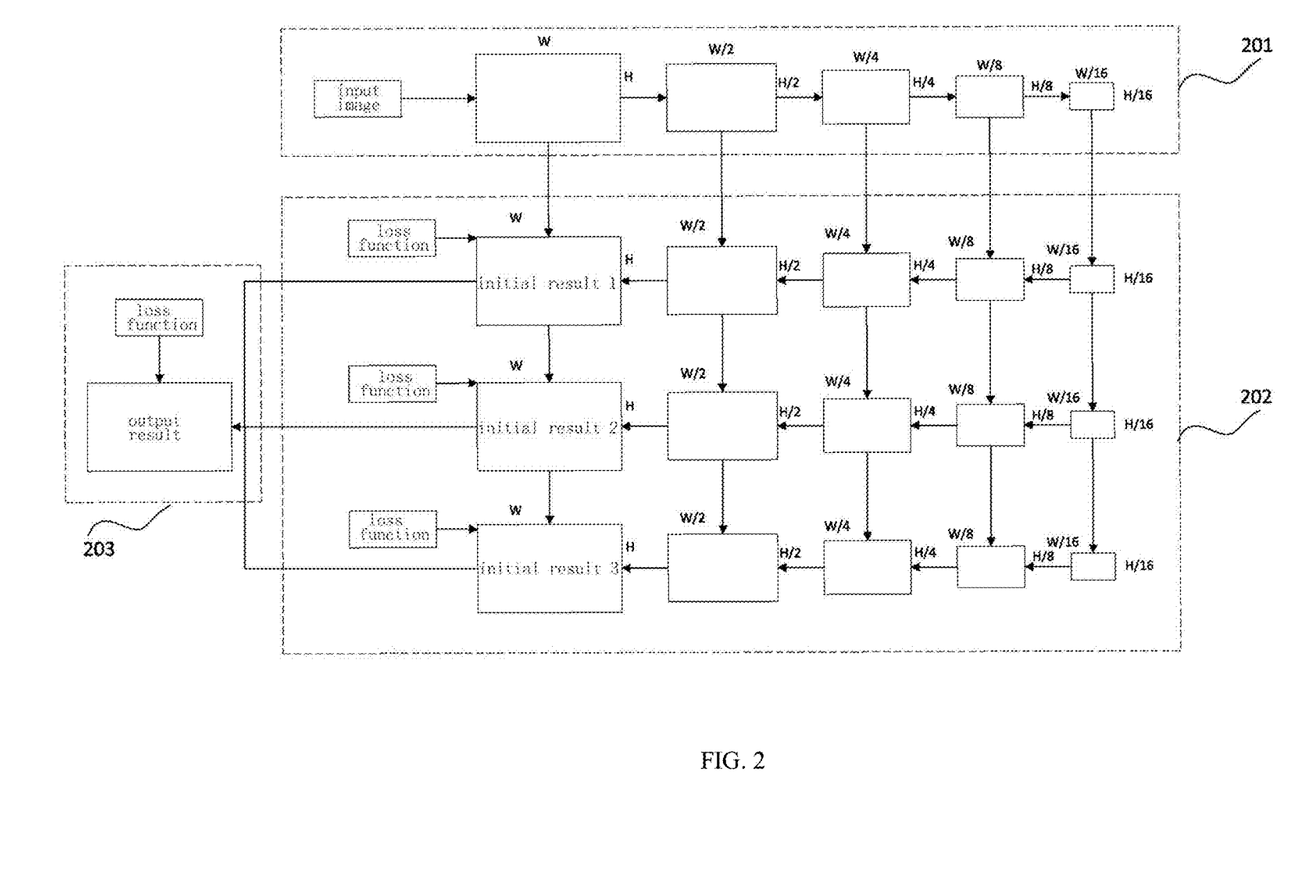
FIG. 2 is a schematic diagram of a framework of a refined segmentation system of an image shadow area according to another embodiment of the present invention.

As shown in FIG. 2, a refined segmentation system of an image shadow area according to an embodiment of the present invention includes the feature extraction network 201, the reverse fusion network 202 and the weighted fusion network 203.

1. The Feature Extraction Network

The feature extraction network 201 includes a plurality of sampling layers that are arranged sequentially and a plurality of segmentation features of the shadow area in the input image are obtained through the sampling layers sequentially.

Successive convolutional layers and downsampling layers are stacked by the feature extraction network 201 to obtain the deeper feature expressions of the input image, with a higher discrimination and classification capacity. However, the existence of the plurality of the downsampling layers causes continuous loss of the spatial detail information and constantly reduced feature scales. Specifically, the feature extraction network forward propagates through the successive convolutional layers and downsampling layers to obtain the multi-scale features, which is represented as:

$$(C_{main}^{(1)}, C_{main}^{(2)}, \ldots, C_{main}^{(N)}) = f_{CNN}^{main}(X, W_{main})$$

wherein X represents the input image, $W_{main}$ is a weight of the feature extraction network, N is a number of the downsampling layers, $f_{CNN}^{main}(X, W_{main})$ represents feature extraction of the input image X based on the weight $W_{main}$, $(C_{main}^{(1)}, C_{main}^{(2)}, \ldots, C_{main}^{(N)})$ represents the plural types of multi-scale features extracted through the feature extraction network after forward propagation of the input image through the different downsampling layers. The shallow features have a large scale and rich detail information, and the deep features have a low resolution due to the successive downsampling layers, and lose most of the spatial detail information. Since the deep features are deeper layers in the network, however, a feature expression which is more robust is learned, with a higher classification capacity. In FIG. 2, W and H are width and height of the input image, respectively, and sizes of feature images obtained by the downsampling actions (or fusion) in different layers are correspondingly labeled in the drawings.

2. The Reverse Fusion Network

The reverse fusion network 202 includes a plurality of layered reverse fusion branches. Each of the plurality of layered reverse fusion branches includes a plurality of feature fusion layers arranged in sequence, and two input features are fused in sequence through the feature fusion layer. The feature fusion layers in the reverse fusion branch are arranged corresponding to the sampling layers in the feature extraction network, and an upsampling ratio of the feature fusion layer is set corresponding to a downsampling ratio of the sampling layer equally. In the reverse fusion network, an input of the feature fusion layer in the first reverse fusion branch is an output of the previous feature fusion layer and an output of the corresponding sampling layer. An input of the feature fusion layer in each of the other reverse fusion branches is the output of the previous feature fusion layer and the output of the corresponding feature fusion layer in the upper reverse fusion branch.

The feature extraction network 201 front-line propagates to obtain the multi-scale features of the input image for segmentation of the shadow area, i.e., the deep features for encoding the rich discrimination and classification information and the shallow features for encoding the rich spatial detail information. But effective fusion of the discrimination and classification information and the spatial detail information is required in the refined segmentation of the shadow area. To this end, the effective fusion of the above-mentioned multi-scale features is obtained gradually by using the plural layers of parallel reverse fusion branches which are stacked sequentially in the embodiment of the present invention, which are represented as:

$$(C_{fuse\_1}^{(1)}, C_{fuse\_1}^{(2)}, \ldots, C_{fuse\_1}^{(N)}) = f_{CNN}^{fuse\_1} \\ ((C_{main}^{(1)}, C_{main}^{(2)}, \ldots, C_{main}^{(N)}))$$

$$(C_{fuse\_2}^{(1)}, C_{fuse\_2}^{(2)}, \ldots, C_{fuse\_2}^{(N)}) = f_{CNN}^{fuse\_2} \\ ((C_{fuse\_1}^{(1)}, C_{fuse\_1}^{(2)}, \ldots, C_{fuse\_1}^{(N)}))$$

$$\ldots$$

$$(C_{fuse\_M}^{(1)}, C_{fuse\_M}^{(2)}, \ldots, C_{fuse\_M}^{(N)}) = f_{CNN}^{fuse\_(M-1)} \\ ((C_{fuse\_(M-1)}^{(1)}, C_{fuse\_(M-1)}^{(2)}, \ldots, \\ C_{fuse\_(M-1)}^{(N)}))$$

wherein M represents a number of the adopted parallel reverse fusion branches, and M=3 in the embodiment of the present invention. $f_{CNN}^{fuse\_1}, f_{CNN}^{fuse\_2}, \ldots, f_{CNN}^{fuse\_(M-1)}$ represent reverse fusion of the multi-scale features from the bottom layer to the shallow layer in each reverse fusion branch, and $(C_{fuse\_1}^{(1)}, C_{fuse\_1}^{(2)}, \ldots, C_{fuse\_1}^{(N)})$, $(C_{fuse\_2}^{(1)}, C_{fuse\_2}^{(2)}, \ldots, C_{fuse\_2}^{(N)})$, $\ldots$, $(C_{fuse\_M}^{(1)}, C_{fuse\_M}^{(2)}, \ldots, C_{fuse\_M}^{(N)})$ represent the fused multi-scale features.

Specifically, on the basis of the multi-scale features $(C_{main}^{(1)}, C_{main}^{(2)}, \ldots, C_{main}^{(N)})$ generated by the feature extraction network 201, in the present invention, the first reverse fusion branch $f_{CNN}^{fuse\_1}$ is adopted first to fuse the features with two adjacent scales each time from the deep to shallow layers, thereby gradually fusing the multi-scale features of the feature extraction network 201 and simultaneously generating the multi-scale fused features gradually. Specifically, the operation of fusing the multi-scale features is started from the deepest layer $(C_{main}^{(N)})$ by the reverse fusion branch to gradually fuse the features with two adjacent scales. The generated fused feature serves as a new shallow feature until the shallowest feature $(C_{main}^{(1)})$ with the scale of the original image. Every time the features in two layers are fused, the deeper feature is upsampled by 2 times first, the two features with different information are then fused by feature stitching, and finally, the final fused feature is obtained through a convolutional layer with a convolution kernel of 3*3. The generated fused features are further fused as new shallower features, which are represented as:

$$C_{main}^{n-1'} = f_{conv}(f_{concat}(C_{main}^{n-1}, \text{up}(C_{main}^{n})))$$

wherein $C_{main}^{m}$ represents the deeper feature with the smaller scale in the n-th layer, up( ) represents the upsampling operation, $f_{concat}$ represents the feature stitching operation, $f_{conv}$ represents the 3*3 convolutional layer for generating the fused feature, and $C_{main}^{n-1'}$ represents the new deeper feature with a larger scale in the (n−1)-th layer. The multi-scale features of the feature extraction network 201 are gradually fused from the bottom layer by the reverse fusion branch, in which the scale of the features are increased gradually and fused with the shallowest features to obtain the fused feature with the same scale as the input image.

The above-mentioned fusion of the first reverse fusion branch is a progressive process with the scale increased gradually, in which a plurality of intermediate features ($C_{fuse\_1}^{(1)}, C_{fuse\_1}^{(2)}, \ldots, C_{fuse\_1}^{(N)}$) are generated gradually, but the plurality of intermediate features have different scales. Meanwhile, different types of and different layers of feature expressions are encoded therein. The discrimination and classification information as well as the spatial detail information benefit to refined segmentation of the shadow area are also encoded by these different types of features. Similar to the multi-scale features to be fused of the feature extraction network 201, the plural types of multi-scale fused feature expressions generated by the first reverse fusion branch may also be regarded as the feature to be fused, and need to be further fused. Therefore, in the present invention, the multi-scale fused features generated by the first reverse fusion branch is further fused by a second reverse fusion branch $f_{CNN}^{fuse\_2}$. Similarly the second reverse fusion branch adopts a "deep to shallow" approach, starting with the smallest and deepest feature in the multi-scale features of the first reverse fusion branch and gradually fusing two adjacent scale features until it has the shallowest feature with the same scale as the input image. Similarly, a plural types of multi-scale fused features ($C_{fuse\_2}^{(1)}, C_{fuse\_2}^{(2)}, \ldots, C_{fuse\_2}^{(N)}$) are gradually generated in the fusion process of the second reverse fusion branch. Therefore, in the present invention, a third reverse fusion branch $f_{CNN}^{fuse\_3}$ is superposed on the basis of the second reverse fusion branch to perform deep-to-shallow fusion again on the multi-scale features generated by the second reverse fusion branch.

Thus, the above-mentioned three parallel reverse fusion branches are stacked sequentially, and the multi-scale features of the input image for encoding the discrimination and classification information as well as the spatial detail information are fused effectively, thereby implementing refined segmentation of the shadow area of the image.

3. The Weighted Fusion Network

The weighted fusion network 203 is configured to perform weighted fusion on the outputs of the plurality of reverse fusion branches to obtain a final segmentation result of the shadow area of the input image.

The multi-scale features of the input image are more effectively fused gradually by the plurality of parallel reverse fusion branches which are also located in different layers and contain image features of different layers, and the distinguishing and classification information as well as the spatial detail information are encoded in these different types of features. Effective fusion of the plural types of multi-scale features is crucial for accurate segmentation of the shadow area of the image. Therefore, in the present embodiment, output results of these parallel reverse fusion branches are fused by means of deep weighted fusion, so as to further fuse the multi layer features, which are represented as:

$$(Y_1, Y_2, \ldots, Y_M) = \text{Loss}_{deep\_fuse}(C_{fuse_1}^{(N)}, C_{fuse_2}^{(N)}, \ldots, C_{fuse_M}^{(N)})$$

wherein $\text{Loss}_{deep\_fuse}$ represents supervised learning on the M reverse fusion branches with manual label information, and ($Y_1, Y_2, \ldots, Y_M$) represents the output results of the M reverse fusion branches (for example, initial result 1, initial result 2 and initial result 3 in FIG. 2.). Finally, weighted fusion is performed on the prediction results of the plural reverse fusion branches to obtain the final output result, which are represented as:

$$Y = \Sigma_{m=1}^{M} W_m Y_m$$

wherein $W_m$ is a weight of a weighted sum of the m-th reverse fusion branch, and Y is the final output result.

4. The Network Training

Since the shallowest fused features $C_{fuse_1}^{(N)}, C_{fuse_2}^{(N)}, \ldots, C_{fuse_M}^{(N)}$ of the plural parallel reverse fusion branches have the same scale as the input image and are obtained after preliminary effective fusion of the multi-scale features in different layers, in the present invention, a binary-classification cross entropy loss function is used as a loss function, and with a training sample of the shadow area, which is labeled manually as supervision information, prediction of the shadow area is learned with the corresponding shallowest features for the plural parallel reverse fusion branches. The multi-scale features of the fusion branches in different layers are encoded by these initial predication results ($Y_1, Y_2, \ldots Y_M$) of the shadow area, respectively. Then, weighted summation $Y = \Sigma_{m=1}^{M} W_m Y_m$ is performed on the initial prediction results of these parallel reverse fusion branches to obtain the final segmentation results of the shadow area as the output results, and weighting parameters of weighted fusion are adjusted through an end-to-end learning process by using the training sample of the shadow area which is labeled manually and the binary-classification cross entropy loss function. Thus, information of the plural layers of fusion branches is encoded by the weighted fusion results of the plurality of parallel reverse fusion branches. The segmentation result of the shadow area may be further refined.

A refined segmentation method of an image shadow area according to an embodiment of the present invention based on the above-mentioned refined segmentation system of an image shadow area, includes the following steps:

step S10, downsampling the input image layer by layer through the feature extraction network to obtain a plurality of segmentation features of the shadow area of the input image;

step S20, obtaining a prediction result of the shadow area output by each reverse fusion branch based on the plurality of segmentation features of the shadow area of the input image obtained in step S10; and step S30, performing weighted fusion on the prediction result of the shadow area output by each reverse fusion branch through the weighted fusion network to obtain the final segmentation result of the shadow area of the input image.

Figure 3A:
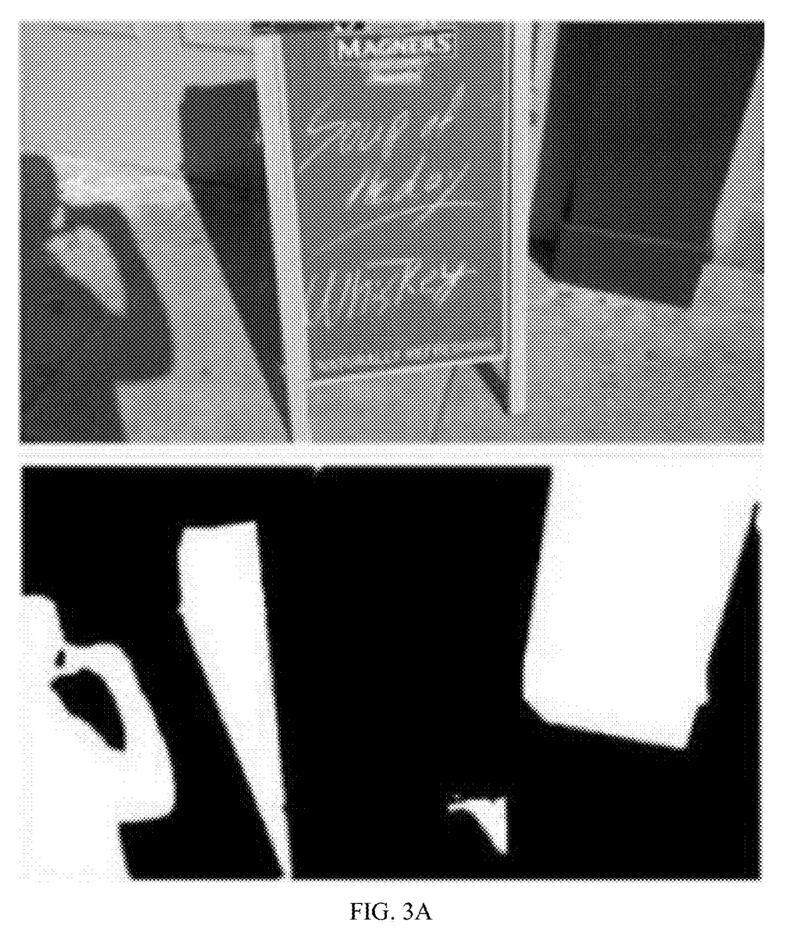
FIGS. 3A, 3B and 3C are respectively a diagram of an exemplary refined segmentation result of the image shadow area according to the present invention.
Figure 3B:
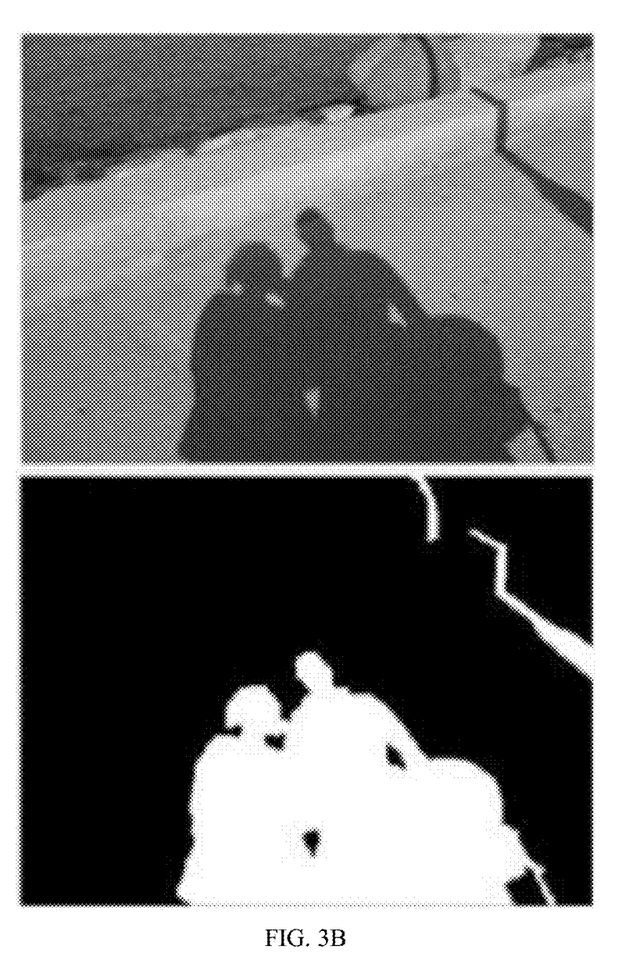
Figure 3C:
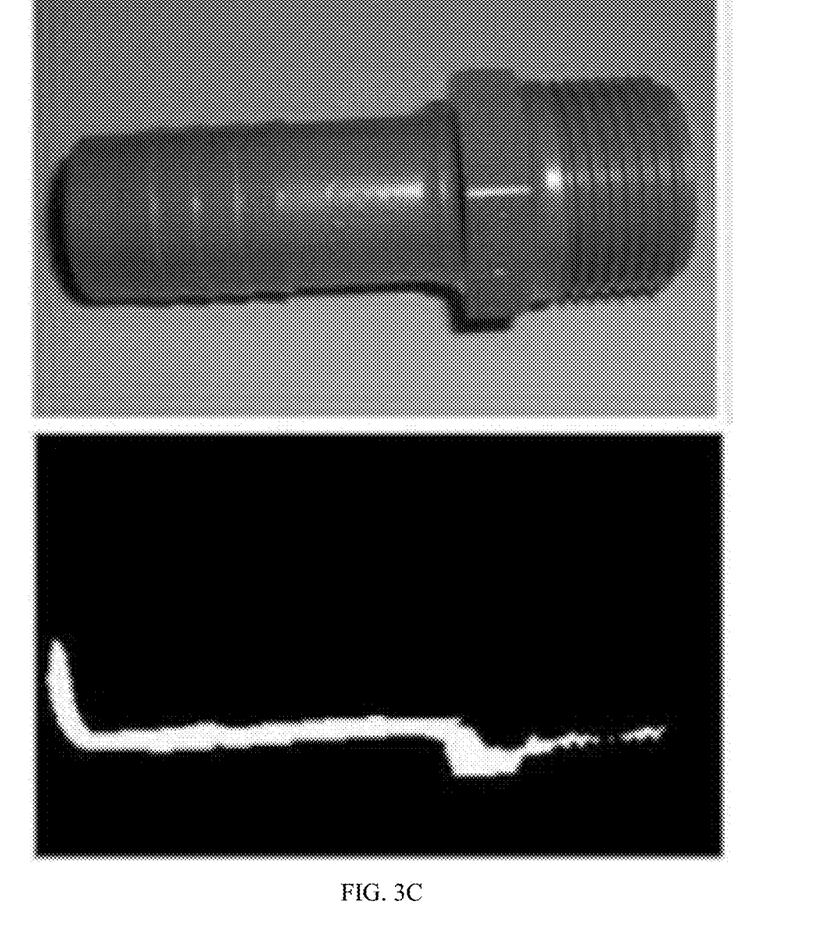

FIGS. 3A, 3B and 3C are respectively a view of exemplary refined segmentation of the image shadow area according to the present invention. The input image is located in the first row, and the segmentation result of the image shadow area. Obtained in the present invention is located in the second row.

It may be clearly understood by those skilled in the art that, for the purpose of convenient and brief description, for a partial working process of the foregoing method as well as related descriptions, reference may be made to the corresponding process in the foregoing system embodiments, and details are not repeated herein.

A storage device according to an embodiment of the present invention has a plurality of programs stored therein, in which the plurality of programs are suitable for being loaded and executed by a processor to implement the above-mentioned refined segmentation method of an image shadow area.

A processing device according to an embodiment of the present invention includes: a processor suitable for executing a plurality of programs; and a storage device suitable for storing the plurality of programs which are suitable for being loaded and executed by the processor to implement the above-mentioned refined segmentation method of an image shadow area.

It may be clearly understood by those skilled in the art that, for the purpose of convenient and brief description, for a detailed working process of the foregoing storage device and processing device, as well as related descriptions, reference may be made to the corresponding process in the foregoing method embodiments, and details are not repeated herein.

Those skilled in the art should be aware that, modules and method steps of the examples described with reference to the embodiments disclosed herein can be implemented by electronic hardware, computer software, or a combination thereof. Programs corresponding to the software modules and the method steps may be configured in a random access memory (RAM), a memory, a read only memory (ROM), an electrically programmable ROM, an electrically erasable programmable ROM, a register, a hard disk, a removable disk, a CD-ROM, or a storage medium in any other forms well-known in the art. To clearly describe interchangeability between electronic hardware and software, the foregoing has generally described compositions and steps of each example according to functions. Whether these functions are performed in an electronic hardware or software manner depends on specific applications and design constraint conditions of the technical solutions. Those skilled in the art may use different methods to implement the described functions for each specific application, but it should not be considered that the implementation goes beyond the scope of the present invention.

The terms "comprise" or any other similar terms are intended to cover a non-exclusive inclusion, such that the process, the method, the article or the device/apparatus including a series of factors not only comprise those elements, but also comprise other factors that are not clearly listed, or further comprise those inherent factors of said process, method, article or device/apparatus.

The technical solutions of the present invention have been described hitherto in conjunction with the preferred embodiments shown in the drawings. However, it is readily conceivable by those skilled in the art that the scope of protection of the present invention is apparently not limited to these embodiments. Equivalent modifications or substitutions may be made to related technical features by those skilled in the art without departing from the principle of the present invention, and technical solutions derived from these modifications and substitutions will all fall within the scope of protection of the present invention.

What is claimed is:

1. A refined segmentation system of an image shadow area, comprising a feature extraction network, a reverse fusion network and a weighted fusion network;

wherein the feature extraction network comprises a plurality of sampling layers arranged sequentially, and a plurality of segmentation features of a shadow area in an input image are obtained through the plurality of sampling layers sequentially;

the plurality of sampling layers arranged sequentially specifically comprise successive convolutional layers and downsampling layers, wherein the successive convolutional layers and the downsampling layers are stacked; multi-scale features are obtained through the successive convolutional layers and the downsampling layers, and the multi-scale features are represented as: $(C_{main}^{(1)}, C_{main}^{(2)}, \ldots, C_{main}^{(N)})=f_{CNN}^{main}(X, W_{main})$, wherein X represents the input image, $W_{main}$ is a weight of the feature extraction network, N is a number of the downsampling layers, $f_{CNN}^{main}(X, W_{main})$ represents a feature extraction of the input image X based on $W_{main}$, $(C_{main}^{(1)}, C_{main}^{(2)}, \ldots, C_{main}^{(N)})$ represents plural types of the multi-scale features extracted through the feature extraction network after forward propagation of the input image through the downsampling layers;

the reverse fusion network comprises a plurality of reverse fusion branches, each reverse fusion branch of the plurality of layered reverse fusion branches comprises a plurality of feature fusion layers arranged in sequence, and two features, each input from one of two layers, are fused in sequence through the plurality of feature fusion layers;

the plurality of feature fusion layers in the each reverse fusion branch are arranged corresponding to the plurality of sampling layers in the feature extraction network, and an upsampling ratio of each feature fusion layer of the plurality of feature fusion layers is arranged corresponding to a downsampling ratio of each sampling layer of the plurality of sampling layers equally;

in the reverse fusion network, an input of a first feature fusion layer in a first reverse fusion branch of the plurality of reverse fusion branches is an output of a previous feature fusion layer and an output of a corresponding sampling layer; inputs of the feature fusion layer in other reverse fusion branches of the plurality of reverse fusion branches are the output of the previous feature fusion layer and an output of a feature fusion layer corresponding to previous feature fusion layer an upper reverse fusion branch of the plurality of reverse fusion branches; and the weighted fusion network is configured to perform a weighted fusion on outputs of the plurality of layered reverse fusion branches to obtain a final segmentation result of the shadow area of the input image.

2. The refined segmentation system of the image shadow area according to claim 1, wherein said fusion of two features in sequence through the plurality of feature fusion layers further comprises:

upsampling the one of the two features from the deeper of the two layers by a set ratio;

fusing the upsampled feature with the other of the two features by feature stitching; and obtaining a final fused feature through a convolutional layer.

3. The refined segmentation system of the image shadow area according to claim 2, wherein the convolutional layer for obtaining the final fused feature has a convolution kernel of 3*3.

4. The refined segmentation system of the image shadow area according to claim 3, wherein a binary-classification cross entropy loss function is used as a loss function to perform a training of prediction of the shadow area by the feature extraction network and the each layered reverse fusion branch based on a training sample with the shadow area labeled manually.

5. The refined segmentation system of the image shadow area according to claim 2, wherein a binary-classification cross entropy loss function is used as a loss function to perform a training of prediction of the shadow area by the feature extraction network and the each layered reverse fusion branch based on a training sample with the shadow area labeled manually.

6. The refined segmentation system of the image shadow area according to claim 1, wherein
a number of the plurality of layered reverse fusion branches is three.

7. The refined segmentation system of the image shadow area according to claim 6, wherein a binary-classification cross entropy loss function is used as a loss function to perform a training of prediction of the shadow area by the feature extraction network and the each layered reverse fusion branch based on a training sample with the shadow area labeled manually.

8. The refined segmentation system of the image shadow area according to claim 1, wherein
the upsampling ratio of the each feature fusion layer and the downsampling ratio of the each sampling layer are both 2.

9. The refined segmentation system of the image shadow area according to claim 8, wherein a binary-classification cross entropy loss function is used as a loss function to perform a training of prediction of the shadow area by the feature extraction network and the each layered reverse fusion branch based on a training sample with the shadow area labeled manually.

10. The refined segmentation system of the image shadow area according to claim 1, wherein
a binary-classification cross entropy loss function is used as a loss function to perform a training of prediction of the shadow area by the feature extraction network and the each reverse fusion branch based on a training sample with the shadow area labeled manually.

11. The refined segmentation system of the image shadow area according to claim 10, wherein
the binary-classification cross entropy loss function is used as the loss function to optimize weight parameters of the weighted fusion by the weighted fusion network based on the training sample with the shadow area labeled manually.

12. A refined segmentation method of an image shadow area implemented on the refined segmentation system of the image shadow area according to claim 1, comprising the following:
downsampling the input image layer by layer through the feature extraction network to obtain the plurality of segmentation features of the shadow area of the input image;
obtaining a prediction result of the shadow area output by the each reverse fusion branch based on the plurality of segmentation features of the shadow area of the input image; and
performing the weighted fusion on the prediction result of the shadow area output by the each reverse fusion branch through the weighted fusion network to obtain the final segmentation result of the shadow area of the input image.

13. The refined segmentation method of the image shadow area according to claim 12, wherein when features in two layers are fused through the plurality of feature fusion layers in the plurality of layered reverse fusion branches, a deep feature of the features in two layers is upsampled in a set ratio first, the two features in two layers with different information are then fused by a feature stitching, and a final fused feature is obtained through a convolutional layer.

14. The refined segmentation method of the image shadow area according to claim 13, wherein the convolutional layer for obtaining the final fused feature has a convolution kernel of 3*3.

15. The refined segmentation method of the image shadow area according to claim 12, wherein a number of the reverse fusion branches is three.

16. The refined segmentation method of the image shadow area according to claim 12, wherein the upsampling ratio of the each feature fusion layer and the downsampling ratio of the each sampling layer are both 2.

17. The refined segmentation method of the image shadow area according to claim 12, wherein a binary-classification cross entropy loss function is used as a loss function to perform a training of prediction of the shadow area by the feature extraction network and the each reverse fusion branch based on a training sample with the shadow area labeled manually.

18. The refined segmentation method of the image shadow area according to claim 17, wherein the binary-classification cross entropy loss function is used as the loss function to optimize weight parameters of the weighted fusion by the weighted fusion network based on the training sample with the shadow area labeled manually.

19. A non-transitory, computer-readable medium storing a plurality of programs, wherein
the plurality of programs are configured for being loaded and executed by a processor to implement the refined segmentation method of the image shadow area according to claim 12.

20. A processing device, comprising: a processor configured for executing a plurality of programs; and a storage device configured for storing the plurality of programs, wherein the plurality of programs are configured for being loaded and executed by the processor to implement the refined segmentation method of the image shadow area according to claim 12.

* * * * *